No. 782,922. PATENTED FEB. 21, 1905.
E. F. PRICE.
PROCESS OF SMELTING REFRACTORY ORES.
APPLICATION FILED OCT. 19, 1904.
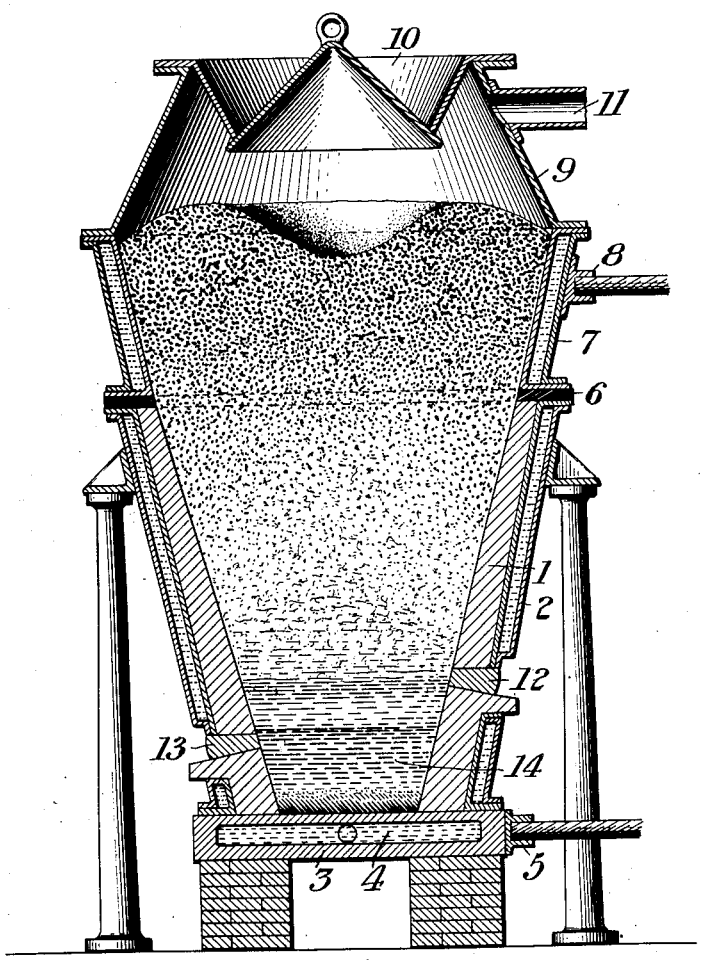
Witnesses:
R. A. Baldwin.
J. B. Hill
Inventor:
Edgar F. Price,
by Byrnes & Townsend,
Att'ys.

No. 782,922. Patented February 21, 1905.

UNITED STATES PATENT OFFICE.

EDGAR F. PRICE, OF NIAGARA FALLS, NEW YORK, ASSIGNOR TO UNION CARBIDE COMPANY, OF NIAGARA FALLS, NEW YORK, A CORPORATION OF VIRGINIA.

PROCESS OF SMELTING REFRACTORY ORES.

SPECIFICATION forming part of Letters Patent No. 782,922, dated February 21, 1905.

Application filed October 19, 1904. Serial No. 229,168.

*To all whom it may concern:*

Be it known that I, EDGAR F. PRICE, a citizen of the United States, residing at Niagara Falls, in the county of Niagara and State of New York, have invented certain new and useful Improvements in Processes of Smelting Refractory Ores and Producing Calcium Carbid, of which the following is a specification.

United States Patent No. 750,096, granted January 19, 1904, to Alfred H. Cowles, describes a process of smelting refractory compounds, especially calcium compounds for the production of calcium carbid, by passing an electric current through a body of the charge acting as a resistance-conductor and increasing the current density along the path of the current to a point where the heat generated by the resistance of the body effects reduction. The electric current is passed through the charge by means of carbon electrodes, the upper electrode being a carbon ring surrounding the charge and constituting the upper part of the stack-furnace and the lower electrode being the carbon hearth of the furnace. Carbon electrodes of the size and character required for this purpose are expensive and perishable. It is difficult to obtain large blocks of carbon of uniform composition, and the carbon is rapidly worn away by the attrition of the charge and its products and in many cases reacts chemically therewith.

According to the present process an electrically-conductive charge of a calcium compound and a reducing agent, specifically a mixture of lime and carbon, is interposed between water-cooled metal electrodes and smelted by the heat generated by the resistance of the charge. The charge is preferably a downwardly-converging vertical column fed through and in contact with the upper electrode. The lower electrode preferably comprises a body of molten iron or other metal which will not combine with the carbid in the lower part of the furnace-chamber. The molten iron serves to purify the carbid by withdrawing therefrom the silicon, which is one of the normal impurities in carbid, the iron being thereby converted into ferrosilicon.

A suitable incandescence furnace is shown in the accompanying drawing, in which the figure is a vertical axial section.

The furnace is a vertical stack comprising a downwardly-converging body 1 of refractory non-conductive material, such as magnesia or siloxicon fire-brick, surrounded by a water-jacket 2. The body is supported upon a horizontal metal plate 3, preferably of cast-steel, having a chamber 4 for the circulation of water and an electric terminal 5. A body 14 of a molten metal or alloy, preferably iron, is supported on the plate 3. The molten body and support-plate consitute the lower electrode of the furnace. Supported upon the body 1, but insulated therefrom by a layer 6 of refractory non-conductive material, is the upper electrode 7, a downwardly-converging water-jacketed iron ring having a terminal 8, the inner surface of the ring being bare, so that it may contact with the charge. Supported upon the electrode-ring 7 is an iron ring 9, which carries a bell-and-hopper charging mechanism 10. An outlet-flue 11 for waste gases extends from the ring 9. Tap-holes 12 13 extend laterally through the body 1 at different heights. In employing this furnace to carry out the process a charge which is electrically conductive or which will be converted into a conductor by the temperature of the furnace—for example, a mixture of lime and carbon—is fed into the stack until its upper portion lies in contact with the electrode-ring 7. If the charge is normally a poor conductor, initial current-paths between the electrodes are provided. The conductivity of the charge may be increased by using a mixture containing large pieces of coke which lie in contact with each other at various points, and thereby afford direct passages for the flow of current. An electric current of sufficient amperage is then passed from the upper electrode through the charge to the body of iron 14, the charge serving as a resistance-conductor in which the temperature gradually rises downwardly by reason of the decreasing cross-section and increasing current density to a zone where the materials react to form carbid, and the carbid is brought into a molten condition. In normal operation the major portion of the body of iron 14 will be maintained in a molten condition by the heat of the charge, the lower portion being pasty or solid on account of the water circulated through the hearth. The molten carbid accumulating upon the iron is intermittently or continuously withdrawn through the tap-hole 12, and fresh charge material is fed into the furnace as required. The waste gases passing up from the zone of reduction through the charge serve to preheat it and are withdrawn through the flue 11 and utilized for fuel.

Calcium carbid usually contains silicon as an impurity reduced from silica in the limestone and from the ash of the carbonaceous material in the charge. This silicon is withdrawn from the molten carbid as it lies upon the molten iron 14, the carbid being thereby purified and the iron being converted into ferrosilicon, which is removed from time to time through the tap-hole 13, more iron being introduced with the charge. The height and resistance of the column of charge can be varied to regulate the necessary voltage by varying the height of the body of iron 14.

I claim—

1. The process of producing calcium carbid, which consists in interposing a charge of a calcium compound and carbon as a resistance-conductor between electrodes, one of said electrodes being of metal and comprising a liquid portion and a solid portion, electrically heating said charge to the temperature requisite for reduction, and cooling the solid portion of said metal electrode, as set forth.

2. The process of producing calcium carbid, which consists in interposing a charge of a calcium compound and carbon as a resistance-conductor between superposed electrodes, the lower electrode being of metal and comprising a liquid portion and a solid portion, electrically heating said charge to the temperature requisite for reduction, cooling the solid portion of the lower electrode, permitting the carbid to settle and collect upon the lower electrode, and removing the carbid and supplying fresh charge materials as required, as set forth.

3. The process of producing calcium carbid, which consists in interposing a charge of a calcium compound and carbon as a resistance-conductor between metal electrodes, electrically heating said charge to the temperature requisite for reducing by an electric current the density of which increases through the charge, and cooling the electrodes to maintain them at a relatively low temperature, as set forth.

4. The process of producing calcium carbid, which consists in interposing a charge of a calcium compound and carbon as a resistance-conductor between electrodes, one of said electrodes being of metal and comprising a liquid portion and a solid portion, electrically heating said charge to the temperature requisite for reduction by an electric current the density of which increases through the charge, and cooling the solid portion of said metal electrode, as set forth.

5. The process of producing calcium carbid, which consists in interposing a charge of a calcium compound and carbon as a resistance-conductor between superposed electrodes, the lower electrode being of metal and comprising a liquid portion and a solid portion, electrically heating said charge to the temperature requisite for reduction by an electric current the density of which increases through the charge, cooling the solid portion of the lower electrode, permitting the carbid to settle and collect upon the lower electrode, and removing the carbid and supplying fresh charge materials as required, as set forth.

6. The process of producing calcium carbid, which consists in interposing a charge of a calcium compound and carbon as a resistance-conductor between superposed electrodes, the lower electrode being of iron and comprising a liquid portion and a solid portion, electrically heating said charge to the temperature requisite for reduction, cooling the solid portion of the lower electrode, permitting the carbid to settle and collect upon the lower electrode, and removing the carbid and supplying fresh charge materials as required, as set forth.

7. The process of producing calcium carbid, which consists in interposing a charge of a calcium compound and carbon as a resistance-conductor between superposed electrodes, the lower electrode being of iron and comprising a liquid portion and a solid portion, electrically heating said charge to the temperature requisite for reduction by an electric current the density of which increases through the charge, cooling the solid portion of the lower electrode, permitting the carbid to settle and collect upon the lower electrode, and removing the carbid and supplying fresh charge materials as required, as set forth.

In testimony whereof I affix my signature in presence of two witnesses.

EDGAR F. PRICE.

Witnesses:
G. E. Cox,
James G. Marshall.

It is hereby certified that in Letters Patent No. 782,922, granted February 21, 1905, upon the application of Edgar F. Price, of Niagara Falls, New York, the title of the invention was erroneously written and printed "Process of Smelting Refractory Ores," whereas the said title should have been written and printed *Process of Producing Calcium Carbid;* and that the said Letters Patent should be read with this correction therein that the same may conform to the record of the case in the Patent Office.

Signed and sealed this 14th day of March, A. D. 1905.

[SEAL.]

F. I. ALLEN,
*Commissioner of Patents.*